(12) United States Patent
Cake et al.

(10) Patent No.: US 6,952,655 B2
(45) Date of Patent: Oct. 4, 2005

(54) USER DEFINED PROCESSING FUNCTION

(75) Inventors: Anthony R. Cake, Meyrin (CH); Thierry Campiche, Geneva (CH)

(73) Assignee: Lecroy Corporation, Chestnut Ridge, NY (US)

( * ) Notice: Subject to any disclaimer, the term of this patent is extended or adjusted under 35 U.S.C. 154(b) by 0 days.

(21) Appl. No.: 10/314,597

(22) Filed: Dec. 9, 2002

(65) Prior Publication Data

US 2003/0135340 A1 Jul. 17, 2003

Related U.S. Application Data

(60) Provisional application No. 60/339,413, filed on Dec. 11, 2001.

(51) Int. Cl.$^7$ ................................................ G09G 5/00
(52) U.S. Cl. ........................ 702/67; 345/771; 345/440; 702/57; 702/68; 702/189
(58) Field of Search ........................ 702/16, 57, 66–68, 702/186, 189, FOR 107–108, FOR 135; 345/771, 965, 966, 440, 400; 700/174, 177, 180

(56) References Cited

U.S. PATENT DOCUMENTS

| | | | | | |
|---|---|---|---|---|---|
| 4,072,851 A | * | 2/1978 | Rose | ............................ | 702/68 |
| 4,809,189 A | * | 2/1989 | Batson | ........................ | 702/67 |
| 5,387,870 A | * | 2/1995 | Knapp et al. | ................ | 324/379 |
| 5,731,984 A | * | 3/1998 | Ullmann | ....................... | 702/67 |
| 6,054,984 A | * | 4/2000 | Alexander | ................... | 345/771 |
| 6,326,986 B1 | * | 12/2001 | Alexander | ................... | 345/764 |
| 6,587,812 B1 | * | 7/2003 | Takayama | .................... | 702/182 |
| 6,624,829 B1 | * | 9/2003 | Beck et al. | ................. | 345/771 |
| 6,639,607 B1 | * | 10/2003 | Ferguson et al. | ........... | 345/734 |
| 2003/0058280 A1 | * | 3/2003 | Molinari et al. | ............ | 345/771 |

OTHER PUBLICATIONS

U.S. Appl. No. 60/315,830.*

* cited by examiner

Primary Examiner—Carol S. W. Tsai
(74) Attorney, Agent, or Firm—Frommer Lawrence & Haug LLP; William S. Frommer

(57) ABSTRACT

A method and apparatus for defining, configuring and performing a custom processing function in a digital oscilloscope. The custom processing function is programmed by the operator using a programming language. The custom function may be linked/chained with other processing functions using a graphical editor. Although the custom processing function may process data offline as in related art systems, the present invention's custom processing function may be inserted/embedded directly into the data processing stream of the digital oscilloscope, thereby processing the data on-line.

12 Claims, 8 Drawing Sheets

USER DEFINED PROCESSING FUNCTION

CROSS-REFERENCE TO RELATED APPLICATIONS

This application claims the benefit of U.S. Provisional Application Ser. No. 60/339,413 filed Dec. 11, 2001, the entire contents thereof being incorporated herein by reference.

1. Field of the Invention

The present invention relates generally to a method and apparatus for processing waveform data acquired by an oscilloscope using a streaming architecture.

2. Background of the Invention

A digital oscilloscope is a complex instrument for measuring electrical signals. Traditionally, digital storage oscilloscopes (DSOs) capture an electrical signal (waveform) and allow the user to view a trace of the captured signal in a time (x-axis) versus amplitude (y-axis) display. In addition to displaying the signal's trace, DSOs can perform mathematical processing on the captured waveform. This processing can be used to transform the entire waveform or to determine certain properties (features, parameters, measurements) of the captured signal. These properties are traditionally displayed as individual values associated with a particular signal trace on the DSO's screen. Typically, the processing is controlled and/or pre-selected using various display menus.

When analyzing a single feature of a particular captured signal (e.g. the rising edge of a signal), the ability to display processed values is a valuable tool. DSOs are now capable of performing numerous complex processing operations.

Digital oscilloscopes are generally composed of many electronic hardware and software modules that operate together in capturing, processing, displaying and storing information that characterizes the signals of interest to an operator. When developing instruments that are easy to set up and use, there are several requirements that need to be addressed, despite the inherent complexity of the task. To ensure compliance with such requirements, digital oscilloscope data processing (including parametric and waveform processing) functions have traditionally been hard-coded into the system. While in some systems the operator has the capability to chain processing elements and to change various processing parameters, support has not been provided to allow operators to define their own 'custom' processing.

In the traditional schemes for controlling a digital oscilloscope or the like, there has been no clearly defined generic model for processing various acquired waveforms and the like. Rather, the available functionality is primarily predefined, without much flexibility available to the user. This is likely because few developers of these instruments, much less the users, have had a clear idea of how to abstractly express the processing performed within these instruments.

Thus a problem exists that although some Digital Sampling Oscilloscopes (DSO) support the ability to chain together standard processing functions, none support a method enabling an operator to insert a fully custom processing function into the DSO.

Accordingly, the present invention is a method and apparatus which allows DSO operators to define and integrate custom processing functions directly into the data stream being processed by the DSO.

SUMMARY OF THE INVENTION

Therefore, it is an object of the present invention to provide a method and apparatus for developing custom processing functions for direct operation on the data processed in a digital oscilloscope.

The present invention is a method and apparatus for defining, configuring and performing a custom processing function in a digital oscilloscope. The custom processing function is programmed by the operator using a programming (scripting) language such as Visual Basic or Java. The custom function may be linked/chained with other processing functions using a graphical editor. Although the custom processing function may process data offline as in related art systems, the present invention's custom processing function may be inserted/embedded directly into the data processing stream of the digital oscilloscope, thereby processing the data on-line.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
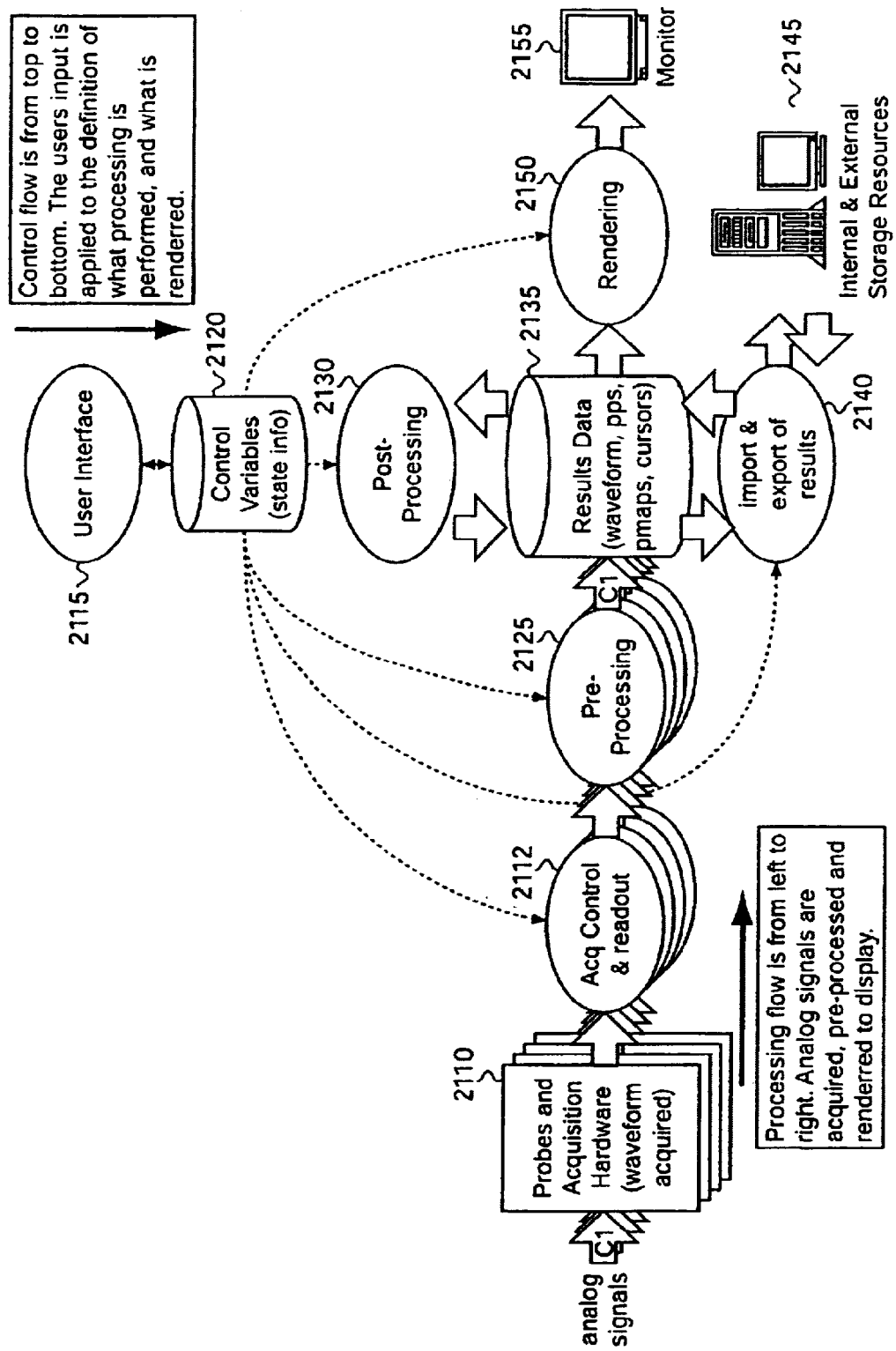
FIG. 1 is a graphical conceptualization of the operation of a digital oscilloscope constructed in accordance with the invention.

The preferred embodiments of the apparatus and method according to the present invention will be described with reference to the accompanying drawings.

The invention consists of a user defined processing element that may be inserted into the stream of data between the digitizer and the display in a DSO. This user defined processing element 'consumes' various types of 'results' (waveforms, parameters, persistence maps, histograms, etc.) and produces results that can be consumed by other processing elements and/or the display.

The user defined processing element provides a digital oscilloscope user the capability to perform custom data processing using a standard programming language. The invention consists of the development of a processing element, which may contain a 'script' developed in a common programming language such as Visual Basic Script or Java Script. The processing element presents the script with the ability to access the input data (scalar in the case of a parameter, or vector in the case of a waveform) and associated parameters, and also with a location in which to deposit the processed data. The script then has full control over the data. The user defined elements according to the present invention are not limited to scripting languages and may be created using any applicable programming language, whether interpreted or compiled.

Since the above-mentioned scripting languages are usually (but not always) interpreted (as opposed to compiled) it is not the most efficient way to develop processing functions. It is however an ideal prototyping environment with an eye to translating the script into a more efficient compiled form in the future. The processing function which contains the script is 'embedded' in the instrument. The results may be displayed, stored, or processed further in the same way as the output of any of the built-in processing functions.

In addition to performing the processing directly within the script, the user defined function may call upon the services of additional, external applications or components to perform the processing. The script would then be responsible for creating some form of communication path to the external tool, passing it the input data, waiting for processing to complete, and then returning the processed data back to the instrument. A simple scenario would involve passing data to an analysis software tool (such as MatLab™ or MathCad™) for processing and then returning it to the instrument application for display, storage, or further processing.

The script or programming for the user defined processing functions can be done through a popup window, text/dialog box, or a link to a notepad editor. In addition, the function may be programmed off-line, compiled, and transferred as a file to the DSO. Any other common method of programming applicable to the invention may be used.

The user-defined processing is placed 'in-line' in the stream of data from the acquisition system to the display. This allows the DSO to compute functions and feed other processing elements in real time. Hence, the data remains in the processing chain/stream rather than being sent offline for processing as in prior art oscilloscopes. For example, you can filter a channel acquisition, and feed the result to a pre-defined function (e.g. an FFT, Average, Pass/Fail, etc . . . ).

The present invention also allows for debugging processing operations. The user defined operation can be stepped through to analyze and debug the operation of each step in the process. Hence, the user defined operation can effectively be used as a debugging tool.

Modem digital measurement instruments and oscilloscopes (DSO) display many types of informational objects on the screen. Some of the types of information include "raw" acquisition waveforms, processed waveforms, cursors which also display numerical information corresponding to the waveforms, automated measurements on the waveforms, and axis labels and/or descriptors to indicate the scale of the waveforms. Typically, a DSO has separate menus which allow the user to configure a channel, setup a math function, turn on cursors or measurements, etc.

Figure 6:
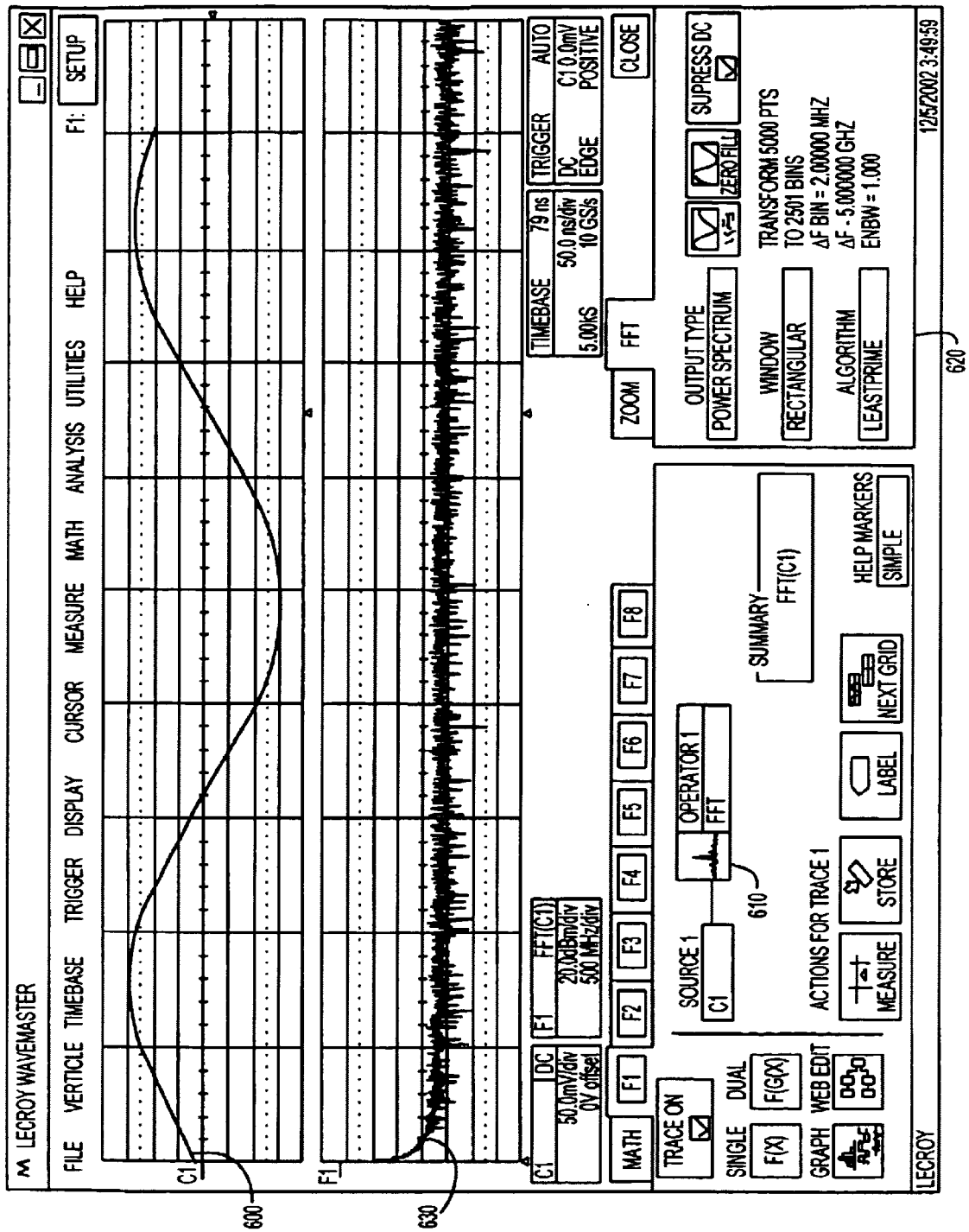
FIG. 6 is an instrument screen showing an input waveform C1, the configuration menu for a standard processing function, and a resulting processed waveform F1.
Figure 7:
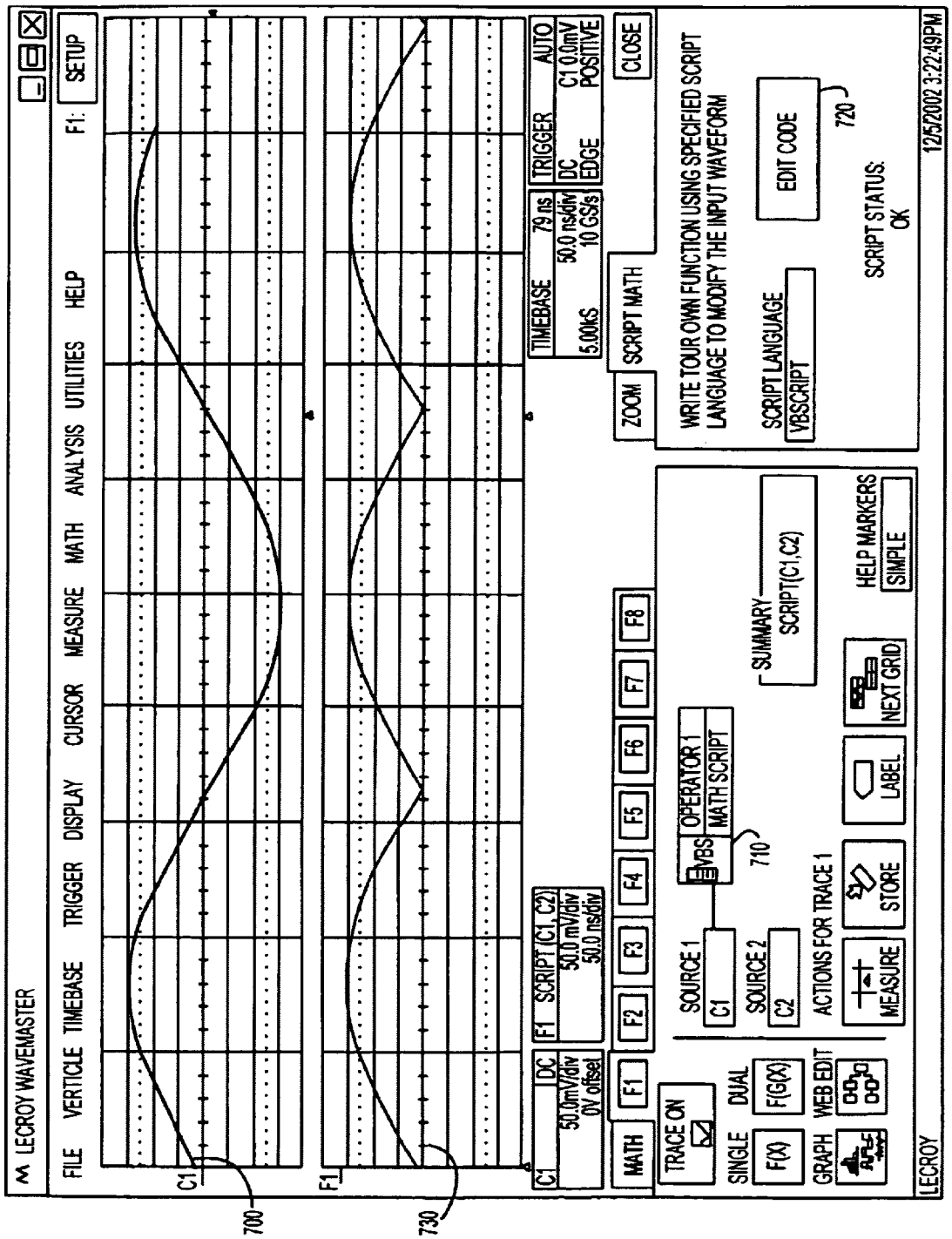
FIG. 7 is an instrument screen showing an input waveform C1, the configuration menu for a custom scripted processing function according to the present invention, and a resulting processed waveform F1.

FIGS. 6 and 7 show a DSO display screen for a waveform processed according to a standard processing function and a user defined processing function, respectively. FIG. 6 is an instrument screen from a DSO showing an input waveform C1 600. The input waveform C1 is processed by a standard processing function as selected in menu 610 and configured in menu 620. In this case, the standard processing function is an FFT operation. The resulting processed waveform F1 630 is shown beneath the input waveform C1. Similarly, FIG. 7 is an instrument screen from a DSO showing an input waveform C1 700. The input waveform C1 is processed by a user defined processing function "match script" as selected in menu 710 and configured in menu 720. In this case, the standard FFT operation of FIG. 6 has been replaced with the user defined operation. The resulting processed waveform F1 730 is shown beneath the input waveform C1.

Figure 8:
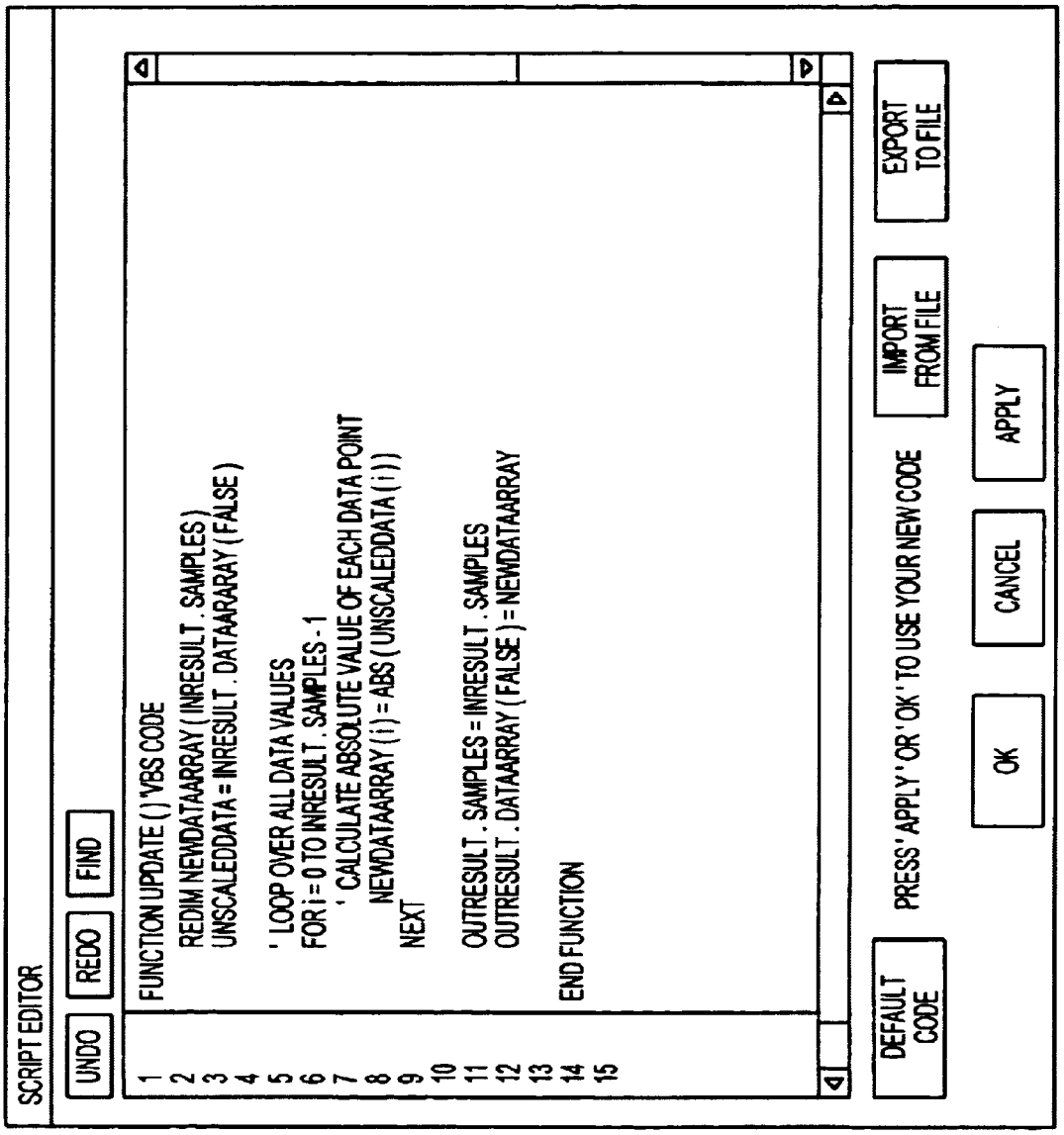
FIG. 8 is a dialog box showing the scripted processing function in FIG. 7.

FIG. 8 is a dialog box showing the scripted processing function used in FIG. 7. This dialog box appears when the Edit Code button in menu 720 of FIG. 7 is selected. This code performs a simple loop over all data values in the waveform, computes the absolute value of each point, and places that value into the output waveform. The effect of this operation is clearly shown by waveform F1 730 in FIG. 7.

Figure 5:
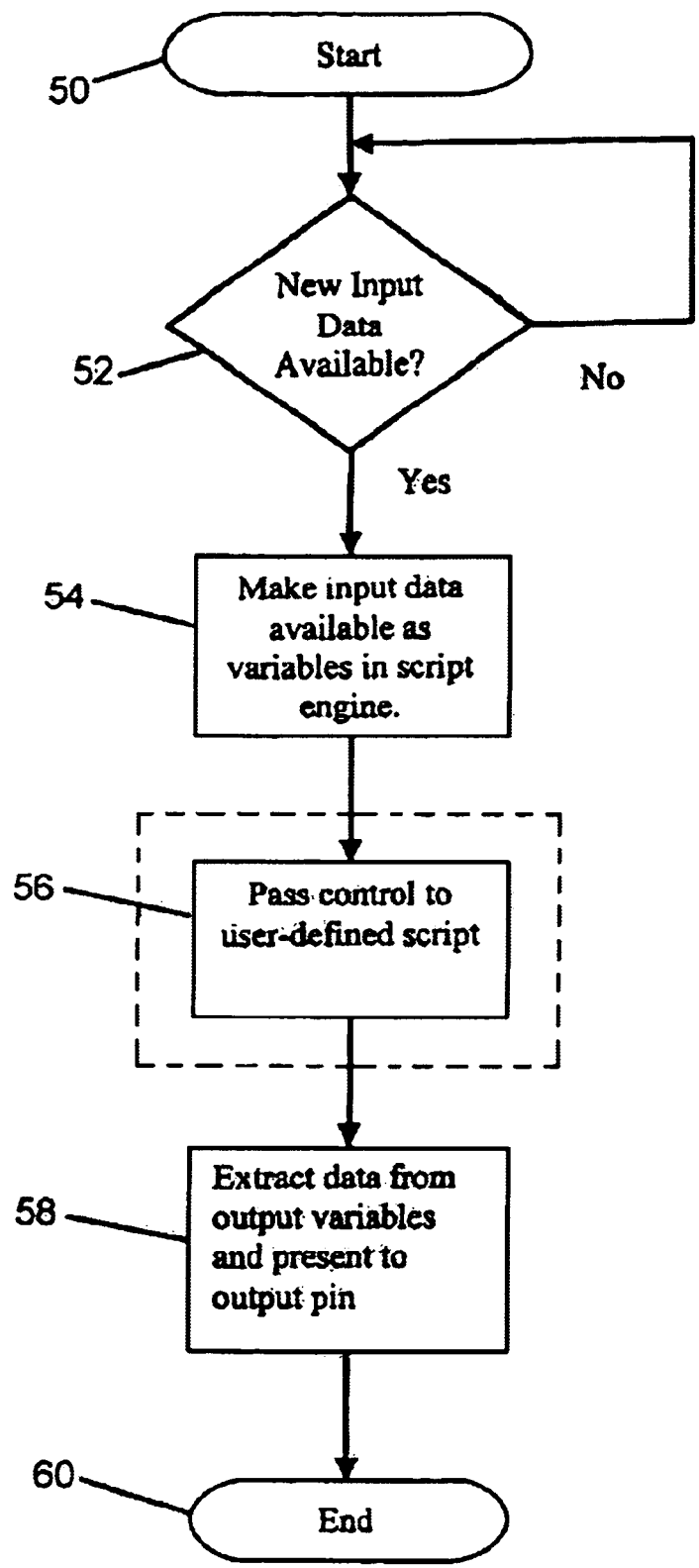
FIG. 5 is a flowchart of the operation of a DSO using a custom function in accordance with the present invention.

FIG. 5 is a flowchart of the operation of a DSO using a custom function in accordance with the present invention. After starting 50, a decision is made whether new input data is available 52. If not, the process loops back on itself until new data is available. If new data is available, then the input data is made available as variables to the script engine 54. Then, processing control is passed to the user-defined script which performs its function(s) in accordance with the script 56. The data is extracted from output variables and presented to the output pin 58, whereby control is passed to the next function 60.

The invention may be implemented in an oscilloscope design that is completely "modular", whereby the elements composing the oscilloscope software are completely specified in terms of interface, and are sufficiently independent in construction that they can be installed and removed at run-time, (e.g. without stopping the process which can be considered the oscilloscope application software). Such an oscilloscope is described in U.S. patent application Ser. No. 9/988,416 filed Nov. 16, 2001, the contents of which are hereby incorporated by reference. This type of oscilloscope is in contrast to existing products that include software that must be wholly replaced (in it's entirety) in order to change any small attribute of the software. This approach offers commercial advantage because it simplifies the overall logistics of adding new software features, fundamental to the product or fundamental to a particular application of the product. As such, a special feature can be added after a customer has taken delivery and has the instrument (oscilloscope) in operation, after the fact, without the requirement to return or for that matter even stop using the instrument. This is of value to both the customer and the manufacturer.

Further, the modular design permits "unit testing" to further advance the quality of the overall product by permitting each individual component of the software to be tested in a standard "test harness". Each component is provided with a standardized interface especially conceived to permit isolated testing. This forward looking, quality conscious aspect of the design assures final deployments of the product(s) are not hampered by the inability to localize faulty components. While these oscilloscopes ease the implementation of the present invention, the present invention may be applied to any oscilloscope.

FIG. 1 is a conceptualization of an oscilloscope which may be used with the present invention and is constructed in accordance with this modular design approach. The flow of data is shown from left to right and control sequences provided by a user, either automated or manual, are shown from top down. As shown in FIG. 1, a plurality of analog acquisition signals $C_1$ are acquired by the oscilloscope of the invention. These acquisition signals are in turn controlled by an acquisition control module 2112 acquired in accordance with various probes and other acquisition hardware 2110. Various acquisition control processes are applied to the acquired waveforms in accordance with various control variables 2120 provided by the user via a user interface 2115.

Thereafter, various results data are provided to, and thereafter output from a preprocessing system 2121, and are in turn acted upon in various post processing functions 2130 employing user defined control variables, resulting in processed data (Results data) 2135. The post-processed data is then exported and/or imported at 2140 as necessary for further processing by the system 2145. After processing has been completed, the various processed data is converted for display at 2150 on a display device 2155.

Figure 2:
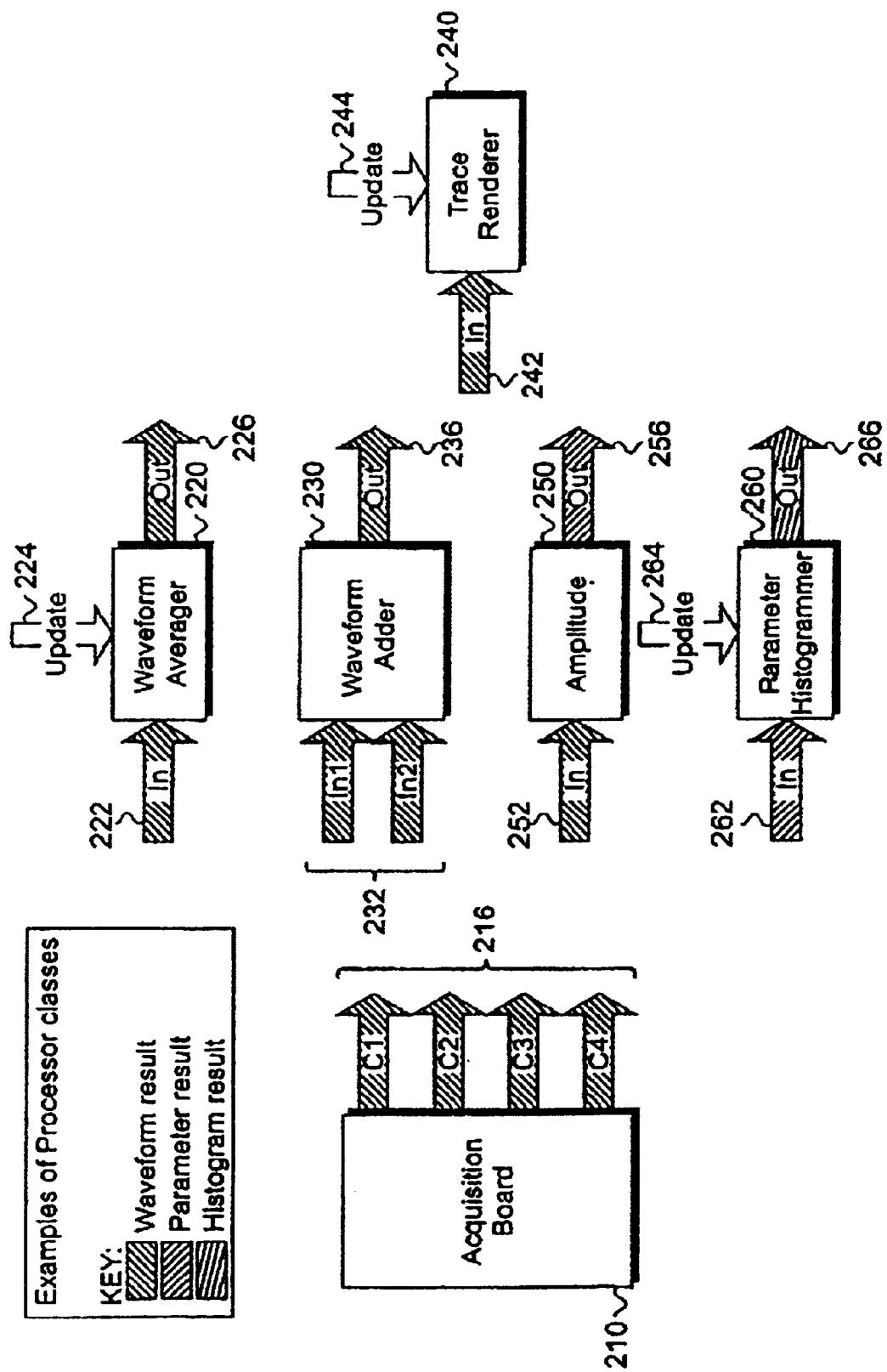
FIG. 2 depicts various examples of processor classes for use by a processing web editor.

FIG. 2 (Examples of Processor classes) illustrates the application of this generic model to several specific processing classes that are typically encountered in digital oscilloscopes. These processor functions are merely representative of a very large number of processor functions that might be implemented or predefined for use in a DSO. In practice, these processor functions may be employed in a processing web, as described below, by placing the element on an appropriate screen, and connecting the various inputs and outputs to implement the processing functions as desired.

In FIG. 2, an Acquisition Board processor class 210 does not have any inputs 216 and has 4 outputs 216 that produce waveforms (1 for each acquisition channel on the board, i.e. C1, C2, C3 and C4 of FIG. 1). A Waveform Averager processor class 220 has 1 input 222 that comprises an input waveform and 1 output 226 that produces a waveform. Furthermore, it includes an update pin 224 that explicitly controls when the waveform produced from the output is updated with respect to the waveforms seen at the input (i.e., precisely the timing of when the processing in the waveform averager is to be implemented). A Waveform Adder processor class 230 has two inputs 232 that comprise waveforms and one output 236 that produces a waveform. Waveform Adder processor class 230 does not have any update pin, and therefore, the waveform produced by its output is always continuously updated in real time with respect to the waveforms seen at its inputs. A Trace Renderer processor class 240 has 1 input 242 that comprises a waveform and 1 update pin 244 that specifies explicitly when the Trace Renderer should sample the waveforms seen at its input. It does not have any result outputs, but rather draws a representation of the input waveforms in a graphics window. The final two examples shown in FIG. 2 illustrate other types of results (namely parameters and histograms). An amplitude processor class 250 comprises waveforms from its input 252 and produces parameter results at its output 256. A parameter histogram processor class 260 comprises parameter results at its input 262 and produces histogram results at its output 266, with an update pin 264 resetting the histogram and beginning the data accumulation process. Thus, because it has an update pin, it is explicitly controlled via the update pin to know when it should receive parameter results at its input and update the histogram results produced at its output. A further description of update pins and the control thereof will be discussed below.

FIG. 2 provides only a few simple examples of the types of processing classes that may be useful in an oscilloscope or other digital signal processing apparatus. As noted above, the modular design allows that any particular processor class may have as many input, output and update pins as is necessary or convenient to implement a particular processing functionality for that processor class. Furthermore, the result types required for any input or generated by any output pin may vary.

As noted above, the input and output pins for a particular processor class provide the ability to inter-connect processor objects, so that one processor object may consume the results produced from another processor object.

The user defined element is not limited to a single input pin and a single output pin. Processors with one or more input pins but no output pins are 'terminal nodes' that can be used when the results of the processing are not required within the processing web, an example of this would be a case where acquired data is required within a MathCAD™ spreadsheet and is displayed within MathCAD™. Another type of processor takes zero input pins but produces one or more output pins. This would be used in the case where the scripting processor produces data but doesn't require an input; a signal simulator is an example of this. Still another type is a processor that supports one or more input pins and one or more output pins. This type of processor would be used where acquired data is processed by the user-defined script and is then returned into the processing chain for further processing and/or display.

A Processing Web Editor (PWEditor), as described in U.S. patent application Ser. No. 9/988,420 filed Nov. 16, 2001, the contents of which are hereby incorporated by reference, is a tool which may be used in conjunction with the invention for presenting the graphical representation of the configuration of a Processing Web (Web) to a user, enabling the web to be reconfigured, and enabling the properties of the various elements in the web to be viewed and modified by the user. Thus, instead of the fixed and constrained processing, a modular processing web may be used. This advanced processing web may be edited in accordance with the PWEditor and may be configured in any manner desired by a user to generate any desired results, as will be described below. The Processing Web defines the flow of data from the input of a DSO through various stages of processing to the display device, as noted above.

While the PWEditor is a natural way to view and reconfigure the web, it is by no means the only way. The web can also be constrained and can emulate the processing flow in conventional DSOs. It can also be configured in a more flexible manner using an equation, i.e. 'Math1=Ch1+Ch2'. While these possibilities are applicable to the present invention, they will not be discussed in detail herein.

Thus, the use of the PWEditor is a graphical representation and modular architecture that provides complete flexibility in terms of how many processing elements compose a given processing web and opens the field to handle other more specific types of processing engines and their results. The PWEditor allows for a true graphical representation of the processing web and the ability to modify it as desired. The processing web consists of various types of processing nodes or objects. These are classified into various types based upon the number, and data type, of the various inputs and outputs (pins) associated therewith. This classification allows functionality provided by traditional DSOs to be described in the processing web, although the web is flexible enough to support non-traditional processing, i.e. nodes which produce simultaneously both waveforms and parameters. Typically, these nodes comprise:

1. Acquisition Systems, which are responsible for the presentation of (primarily) waveform data produced by the acquisition hardware in the DSO.

2. Math nodes, which accept waveform data and produce waveform data.

3. Parameter nodes, which accept waveform data and produce scalar (parameter) results.

4. Pass Fail nodes, which accept waveform and/or parameter inputs and produce a Boolean (pass/fail) result.

5. Adapter nodes, which provide data-type conversion, i.e. float -→ nteger waveform (vector) types.

6. Renderer nodes, which accept any data type and produce graphical results (waveform traces, parameter readouts, etc).

The various input and output pins of the processing nodes are therefore classified based upon the data type that they expose/accept. A detailed description of exemplary functions that may be employed in the PWEditor to change the functional structure of the processing web, and therefore the actual functioning of the oscilloscope is provided below.

Utilizing the PWEditor to implement the invention in the processing web provides the following features. The complexity of the processing web is limited only by available processing power and memory. The traditional separation of math, parameters, and display functions is removed. Processing engines may be dragged into use from a categorized toolbar. An arbitrary number of named and typed input and output pins may be employed. Graphical, real-time, preview of results (both scalar and vector) are provided, even while viewing the web structure. Identification of the data-type of input and output pins may be designated using a color-coded key scheme. Data type adapters are automatically inserted when incompatible types are connected, for example, adaptation between float and integer data types, conversion of vector data into a sequence of scalars, etc. There is also the ability to display, and edit the properties of each node and each pin.

The present invention can be used during normal oscilloscope operations, or in accordance with design of the processing web, through the PWEditor or processing web described above. The invention is also applicable to standard oscilloscopes that do not employ such a processing web. In standard oscilloscopes, the invention would be called from the toolbar and would be used to modify the defined functionality.

Figure 3:
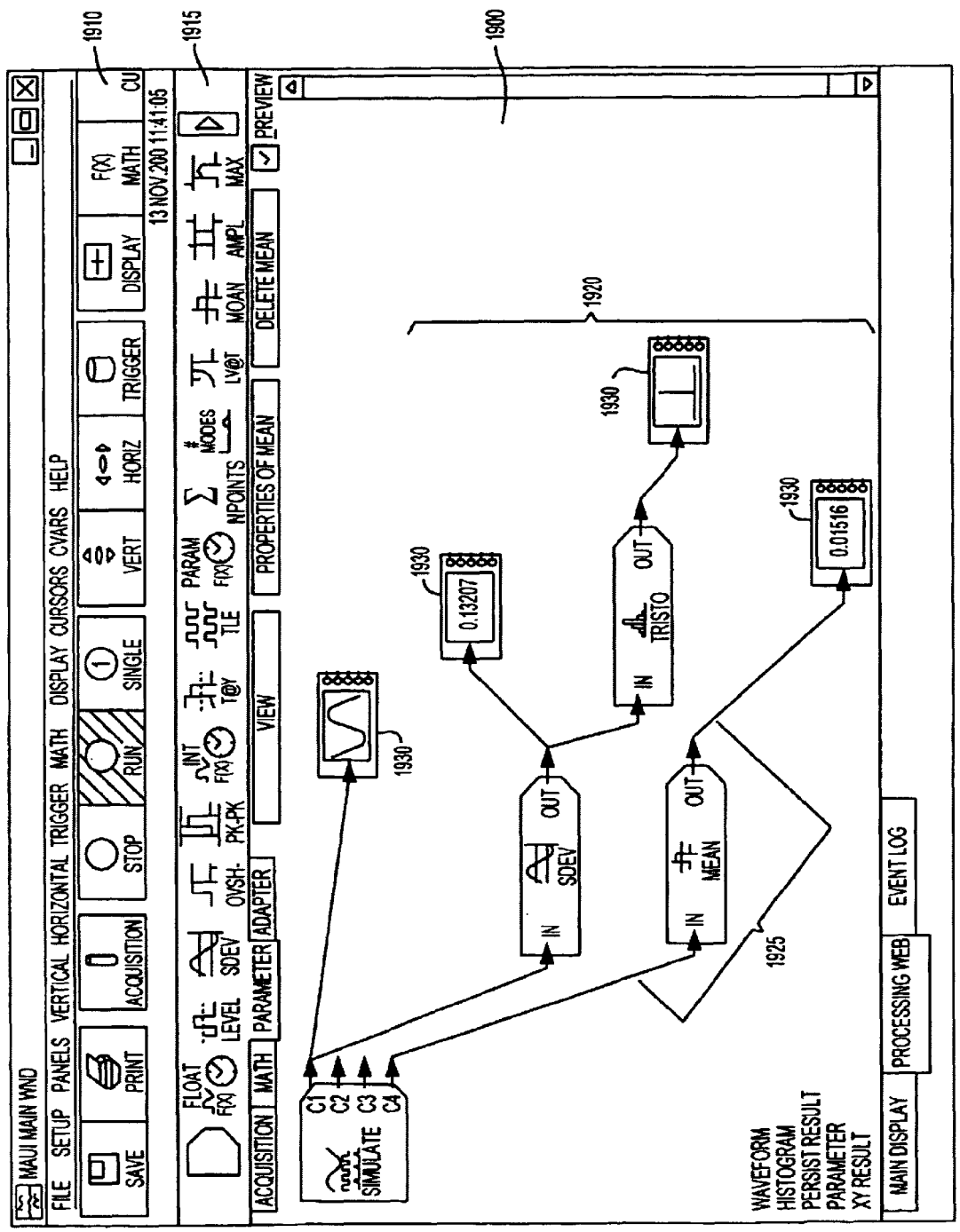
FIG. 3 is an instrument screen showing linked processing operations using a processing web editor.

FIG. 3 provides a screenshot view of a PWEditor in accordance with the above disclosure for developing an example processing web. Various viewing and implementation instructions 1910 are included along the top row while below them are a list of categories 1915 of different functions a user might want to implement in the processing web. The main window portion 1900 of the PWEditor includes the various processing functions 1920 that have already been selected by a user, with the interconnections 1925 therebetween shown. Also shown are various output displays 1930 for displaying a current value of the web at certain locations.

Figure 4:
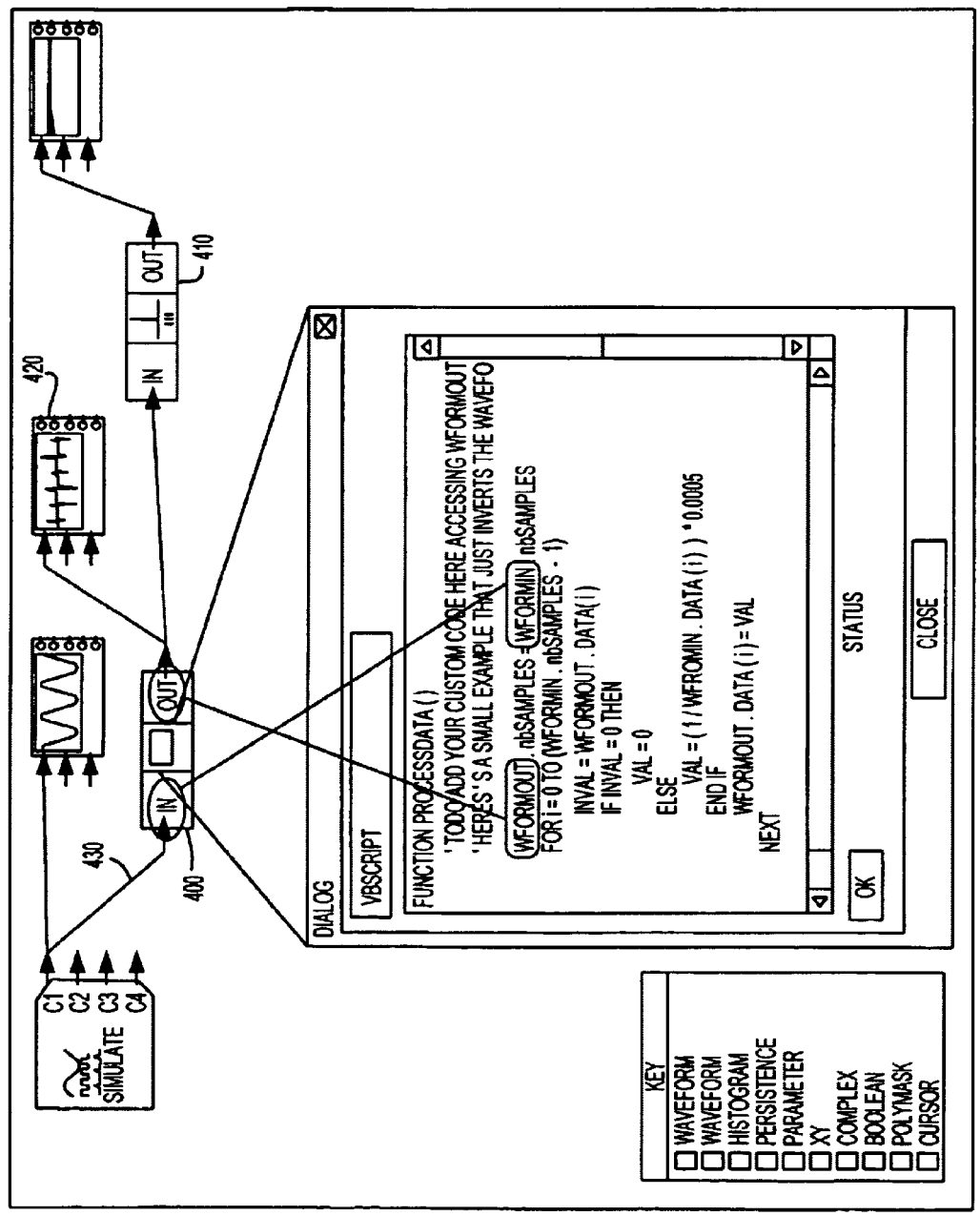
FIG. 4 is an instrument screen showing a customized processing script according to the present invention.

FIG. 4 is an instrument screen showing a customized processing script according to the present invention as implemented in a processing web. FIG. 4 shows a scripting processor 400 with a single floating-point waveform input 430 and a single floating-point waveform output. The output is both displayed 420 and fed to a further processing step, an FFT 410.

The processing performed by scripting processor 400 takes each input data sample and computes:

$$\text{output}[i]=(1/\text{input}[i])*0.0005$$

FIG. 4 also shows a window of the scripting code for implementing this function 400.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method of implementing a user defined processing function for operation in a digital oscilloscope, comprising the steps of:

programming the user defined processing function using a programming language to define a set of processing instructions to be associated with the user defined processing function;

linking the user defined processing function into a data processing stream of the digital oscilloscope; and executing processing in the digital oscilloscope, whereby the user defined processing function operates to perform the set of processing instructions associated with the user defined processing function on data in the digital oscilloscope in-line with the linked data processing stream.

2. The method of claim 1, wherein a graphical editor provides a window display for programming the user defined processing function.

3. The method of claim 1, wherein the programming language is a scripting language.

4. The method of claim 1 wherein the execution step can analyze and debug the operation of the user defined processing function by stepping through the programming.

5. The method of claim 1, wherein the user defined processing function is able to pass data to off-line processing functions.

6. A digital oscilloscope capable of performing a user defined processing function comprising:

programming means for programming the user defined processing function using a programming language to define a set of processing instructions to be associated with the user defined processing function;

linking means for linking the user defined processing function into a data processing stream of the digital oscilloscope; and a processor for executing processing in the digital oscilloscope whereby the user defined processing function operates to perform the set of processing instructions associated with the user defined processing function on data in the digital oscilloscope in-line with the linked data processing stream.

7. The digital oscilloscope of claim 6, wherein the programming language is a scripting language.

8. The digital oscilloscope of claim 6, wherein the programming language is a scripting language.

9. The digital oscilloscope of claim 6, wherein the processor can analyze and debug the operation of the user defined processing function by stepping through the programming.

10. The digital oscilloscope of claim 6, wherein the user defined processing function is able to pass data to off-line processing functions.

11. A method of implementing a user defined processing function for operation in a digital oscilloscope, comprising the steps of:

programming the user defined processing function using a programming language, the user defined processing function being custom programmed by a user to define a set of processing instructions to be associated with the user defined processing function, to receive one or more data inputs, to perform processing on the one or more data inputs and to provide one or more processed data outputs;

linking the user defined processing function into a data processing stream of the digital oscilloscope to receive one or more data inputs and to output one or more processed data outputs as required and provided by said user defined procession function; and executing processing in the digital oscilloscope, whereby the user defined processing operates to perform the set of processing instructions associated with the user defined processing function on the one or more data inputs and provides the one or more processed data outputs in line with the linked data processing streams.

12. An apparatus for implementing a user defined processing function for operation in a digital oscilloscope, comprising the steps of:

programming means for programming the defined processing function using a programming language, the user defined processing function being custom programmed by a user to define a set of processing instructions to be associated with the user defined processing function, to receive one or more data inputs, to perform processing on the one or more data inputs and to provide one or more processed data outputs;

linking means for linking the defined processing function into a data processing stream of the digital oscilloscope to receive one or more data inputs and to output one or more processed data outputs as required and provided by said user defined procession function; and executing means for executing processing in the digital oscilloscope, whereby the user defined processing operates to perform the set of processing instructions associated with the user defined processing function on the one or more data inputs and provides the one or more processed data outputs in-line with the linked data processing streams.

\* \* \* \* \*